(12) United States Patent
Venolia

(10) Patent No.: US 8,161,050 B2
(45) Date of Patent: Apr. 17, 2012

(54) VISUALIZING HYPERLINKS IN A SEARCH RESULTS LIST

(75) Inventor: Gina D Venolia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 12/275,156

(22) Filed: Nov. 20, 2008

(65) Prior Publication Data

US 2010/0125573 A1 May 20, 2010

(51) Int. Cl.
*G06F 7/00* (2006.01)
*G06F 17/30* (2006.01)

(52) U.S. Cl. ........................ 707/741; 707/770

(58) Field of Classification Search .......... 707/706, 707/741, 770, 722, 758
See application file for complete search history.

(56) References Cited

U.S. PATENT DOCUMENTS

| | | | |
|---|---|---|---|
| 6,112,202 A | 8/2000 | Kleinberg | |
| 6,553,367 B2 | 4/2003 | Horovitz et al. | |
| 6,567,103 B1 | 5/2003 | Chaudhry | |
| 7,051,017 B2 | 5/2006 | Marchisio | |
| 7,072,884 B2 | 7/2006 | Kemp | |
| 7,197,716 B2 | 3/2007 | Newell et al. | |
| 2004/0267686 A1* | 12/2004 | Chayes et al. | 707/1 |
| 2006/0047649 A1 | 3/2006 | Liang | |
| 2007/0106641 A1 | 5/2007 | Chi et al. | |
| 2008/0082578 A1 | 4/2008 | Hogue et al. | |
| 2010/0106701 A1* | 4/2010 | Ducatel et al. | 707/706 |

OTHER PUBLICATIONS

Cook, et al, "Using a Graph-Based Data Mining System to Perform Web Search", retrieved at <<http://www.eecs.wsu.edu/~cook/pubs/ijprai03n.ps>>, University of Texas at Arlington, pp. 1-25.
Munzner, "Interactive Visualization of Large Graphs and Networks", retrieved at <<http://graphics.stanford.edu/papers/munzner_thesis/allbw.pdf>>, Stanford University, Jun. 2000, pp. 1-120.
Vercoustre, "Proceedings of the Workshop on the Reuse of Web-based Information", retrieved at <<http://hal.archives-ouvertes.fr/docs/00/16/57/77/PDF/Proceedings.pdf#page=25>>, CSIRO Mathematical and Information Sciences, Jun. 1998, pp. 1-107.
Zhou, "Using Visual Spatial Search Interface for www Applications", retrieved at <<http://cs.nju.edu.cn/~gchen/paper/papers/IS01-02.pdf>>, Information Systems, vol. 26, No. 2, 2001, pp. 61-74.

* cited by examiner

*Primary Examiner* — Usmaan Saeed
*Assistant Examiner* — Navneet K Ahluwalia
(74) *Attorney, Agent, or Firm* — Lee & Hayes, PLLC

(57) ABSTRACT

Generating and displaying an enhanced list of search results appropriate for web searching are described. A method for generating an enhanced list of search results includes identifying web pages that are relevant to a query, identifying other web pages hyperlinked to the relevant web pages, creating a graph of the web pages and connecting hyperlinks, and displaying a list of search results ordered in part by the connecting hyperlinks and showing the connecting hyperlinks as part of the list. The method also includes the ability to regenerate the list based on an indication of subjective relevance of a one of the list items. The method enhances the experience of a user in World Wide Web searching and browsing.

18 Claims, 7 Drawing Sheets

VISUALIZING HYPERLINKS IN A SEARCH RESULTS LIST

TECHNICAL FIELD

The subject matter relates generally to web search technology, and more specifically, to improving usability of web searching by providing information on hyperlinks between web search results as part of a search results list.

BACKGROUND

The Internet, including the World Wide Web, contains a vast amount of information that can be accessed through use of a web search engine returning results in response to a search query. A keyword search can instantly return thousands of web pages relevant to the search terms. However, there is room for improvement in how to best display the results, especially when the results are numerous.

To be effective, the web search engine must effectively identify content, capturing relevant web pages and discarding irrelevant web pages. However, there is often a gap between what users hope to find and the actual results returned from the web search engine. In particular, broad search queries may return too large a number of results for a human user to effectively process. This is known as an abundance problem. The order of returned results, or the ranking, may mistakenly indicate a higher relevance for web pages irrelevant to the user and a lower relevance for the web pages than is actually relevant to the user.

Another problem is that a keyword used as a search query may cause the web search engine to return web pages about unrelated content that shares the keyword. Consider, for example, the keyword "jaguar." The search engine may return results related to luxury cars, a large cat, and an Atari computer system. All the results may be jumbled together in a single list, ordered not by similarity of content, but rather ordered based on a keyword-driven search algorithm. Even though a human user can easily distinguish between a web page discussing Jaguar cars and another web page discussing endangered wild jaguars, that distinguishing is a difficult task for the search engine running a keyword search algorithm.

A further difficulty is accounting for differences between the subjective interpretation of content on a web page and the keywords found on that web page. For example, a web page of Jaguar Cars Ltd. is a web page of an automobile manufacture, but the keywords "automobile manufacture" may be entirely absent from the Jaguar Cars Ltd. web page, and thus, not return that web page as a search result. Even when a web page sought by users contains the keyword, that web page may have a low ranking in the search results. For example, a user searching for "Harvard" would expect that www.harvard.edu is returned as one of the most relevant search results. However, other web pages may use the term "Harvard" more frequently, more prominently, or in some other way as to receive a higher relevance ranking. Ultimately the notion of relevance depends on human judgment and is difficult to capture in any search algorithm.

In a body of information such as the World Wide Web, hyperlinks between web pages are also available to assist users with categorizing and evaluating web pages. A web page that is hyperlinked to by many other web pages (i.e. incoming hyperlinks) may be though of as an "authority." By virtue of many other web pages linking to an "authority" web page that web page is likely to have content relevant to a same topic as the other web pages. Conversely, a web page that has many hyperlinks going to other web pages (i.e. outgoing hyperlinks) may be thought of as a "hub." A "hub" web page may be a list of bookmarks, a directory page, or the like. A large number of other web pages relevant to the same topic can be found from starting at a "hub" web page.

Therefore, it is desirable to find ways to generate search results that allow users to efficiently understand relationships between a large number of search results, distinguish between unrelated content that shares a keyword, and perceive "authority" and "hub" relationships among web pages in a list of search results.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary methods, computer program products, and user interfaces for creating an enhanced listing of search results. This disclosure describes identifying a first set of nodes (e.g. web pages) and a second plurality of nodes (e.g. hyperlinked web pages) connected to the nodes in the first plurality of nodes by edges (e.g. hyperlinks). Once the two sets of nodes are identified, a graph of the nodes (e.g. web pages) and the edges connecting those nodes (e.g. hyperlinks) is created. Techniques from graph theory are used to detect connected components in the graph. In order to show search results to the use, a list of the first set of nodes is created. The items in the list represent nodes and the items in the list are grouped into contiguous clusters based on the groupings established by detecting the connected components. The display of the list is enhanced by including information on the edges connecting one node to another as a part of the list. Thus, the features in this disclosure provide a benefit to individuals by presenting query resulted grouped by shared edge connections and explicitly displaying those edge connections as part of an enhanced list. This enables interpretation of the relevance of query results in the context of the other query results.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
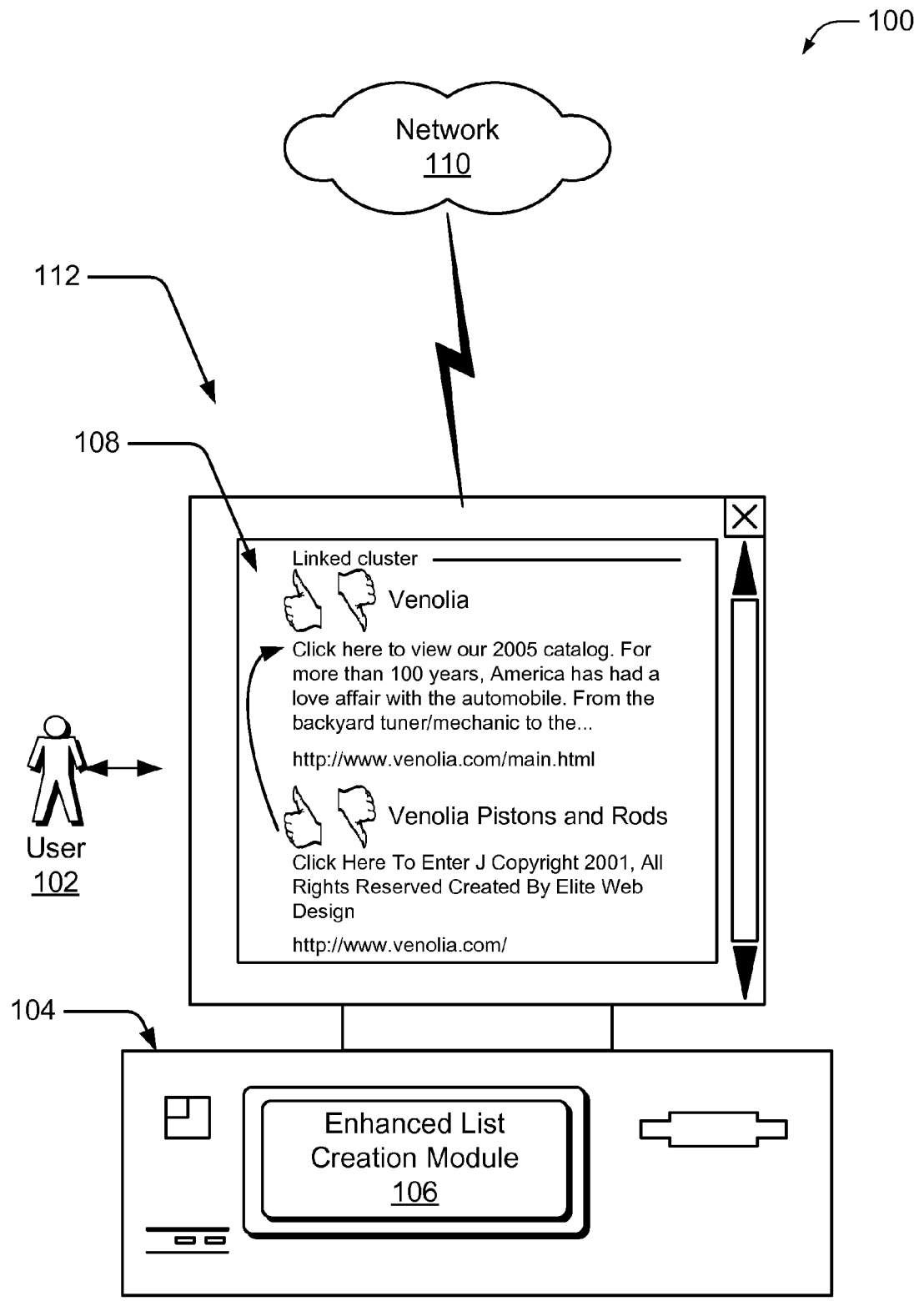
FIG. 1 is a block diagram of an exemplary system for improving the information contained in web search results using an enhanced listing of search results.

This disclosure is directed to various exemplary methods, user interfaces, computer programs, and user interfaces using hyperlink information to organize search results and to reveal hyperlink relationships among web pages in a list of search results. For example, a user searching the World Wide Web with a computer connected to the Internet may receive a list of web pages in response to a search query. The web pages provided in response to the search query are hyperlinked to other web pages some of which may be included in the search results and some of which are not included in the search results. Rather than only providing a list of web page titles, uniform resource locators (URLs), and possibly a sample of content from the web pages, this disclosure discusses enhancing the listing of search results with hyperlink information.

For the sake of convenience, this disclosure uses terms related to a specific embodiment, namely web pages on the World Wide Web and hyperlinks between those web pages. However, this disclosure is applicable to any structure of nodes and edges as these terms are commonly understood in graph theory. In graph theory, a vertex or a node is a fundamental unit out of which graphs are formed. Edges, lines, or arcs may connect some or all of the vertices or nodes. In the World Wide Web embodiment, web pages are nodes and hyperlinks are edges connecting the nodes. Other node and edge structures encompassed by this disclosure include, but are not limited to, telephone call records where phone numbers are nodes and calls between two numbers are edges, a social network where individuals are nodes and "friend" associations between individuals are edges, patents where patents are nodes and inclusion of another patent as a cited reference creates edges between two patents, and the like.

In one aspect, users are able to visualize hyperlinks among web pages provided in a list of search results. Allowing users to visualize hyperlinks among web pages identified by a search engine provides the benefits of revealing relationships between the web pages such as which pages are "authorities" and which are "hubs."

In another aspect, hyperlink connections between web pages allow for grouping web pages into connected components such that the list of search results is shown as a series of logical units. The grouping provides the benefit of allowing users to quickly see if web pages in a results list merely share a keyword or actually contain related content. If a grouping of web pages including the most relevant web pages is listed first in the search results, that listing structure provides an additional benefit of bringing relevant web pages toward the top of the search results even if those pages were initially given a low ranking by a search algorithm.

By using hyperlink information together with results provided by a search engine, the benefits of an objective search algorithm and subjective decisions by people who created the hyperlinks are combined to assist users to sort through an abundance of information. Revealing underlying hyperlinks to users as a part of the search results list enables the users to see a back story of relationships between web pages included in the search results and intuitively identify "authority" and "hub" web pages, even if the users are not familiar with these concepts.

FIG. 1 shows a block diagram of an exemplary system 100 for a user 102 to interact with a computing device 104 containing an enhanced list creation module 106 functionality to create an enhanced listing of search results 108. The computing device 104 may be connected to a network 110 such as the Internet. In this embodiment, the enhanced list creation module 106 is shown as contained within the computing device 104; however, the enhanced list creation module 106 may also exist all or in part in the network 110. In response to a search query from the user 102, the computing device 104 displays an enhanced listing of search results 108 on a display device 112. An user interface to display the enhanced listing of search results 108 is discussed in more detail with respect to FIGS. 2, 3, and 4.

Exemplary User Interfaces

Figure 2:
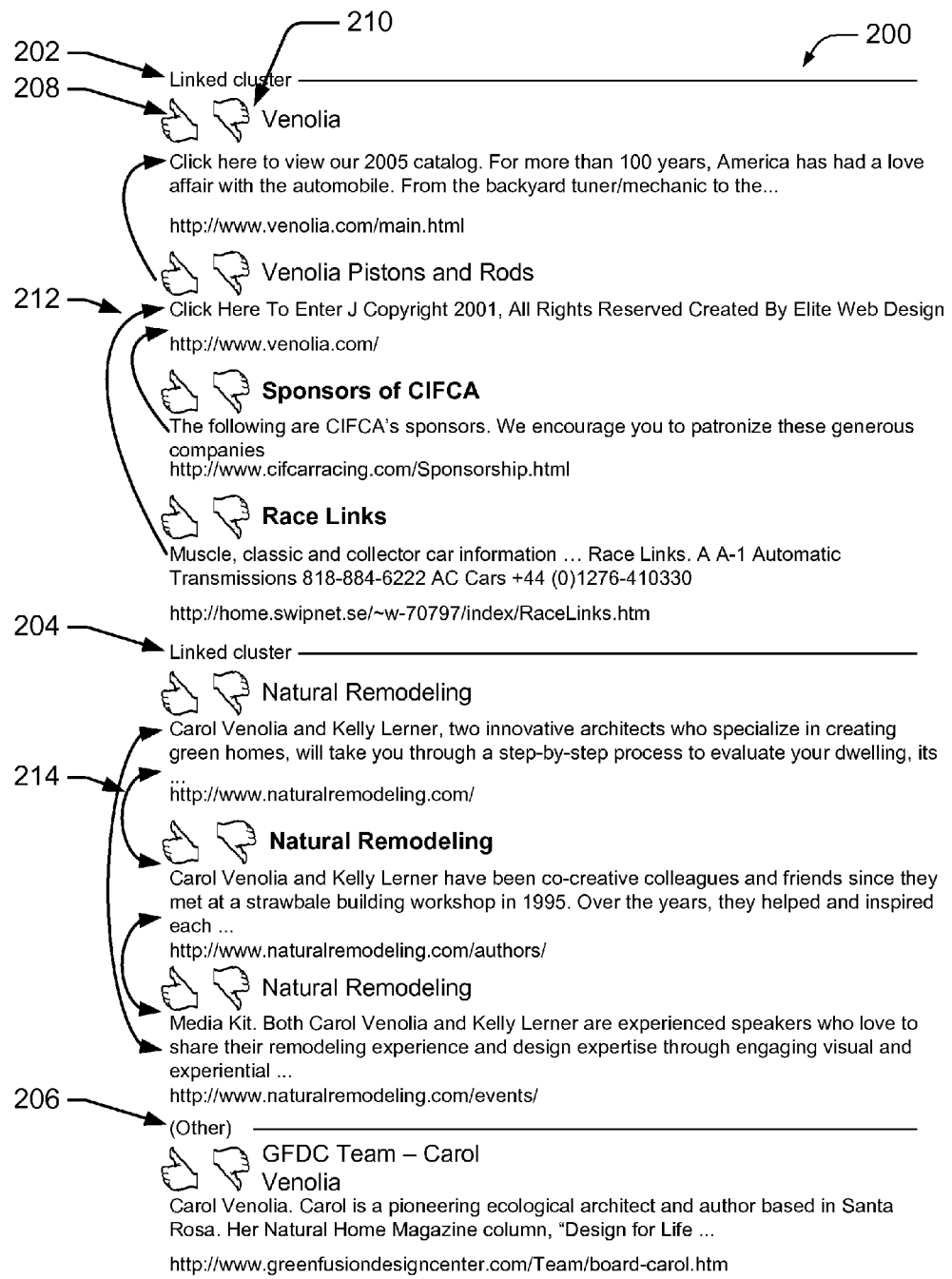
FIG. 2 is a schematic diagram showing an overview of an exemplary user interface for providing a listing of search results.
Figure 3:
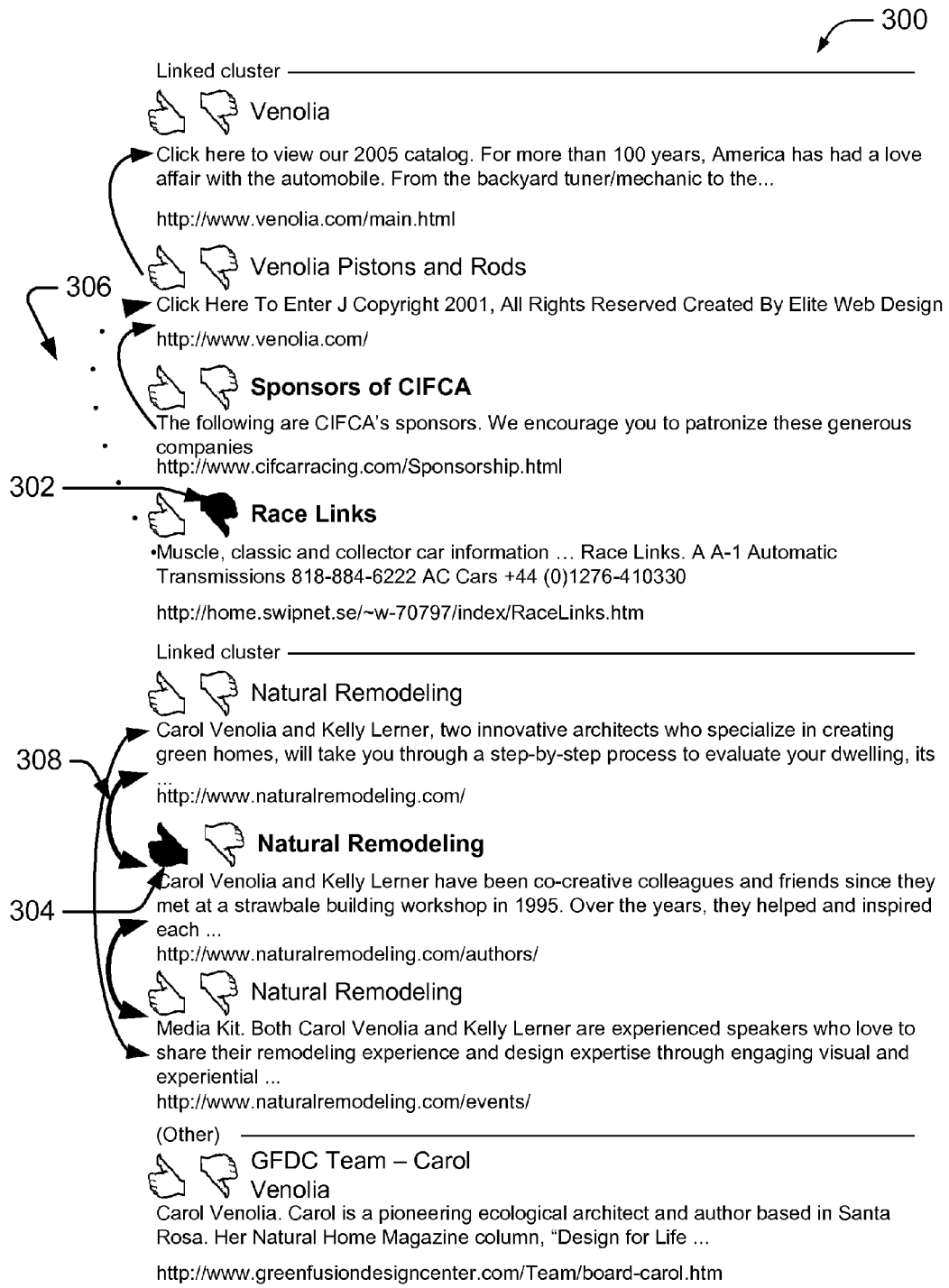
FIG. 3 is a schematic diagram showing an exemplary user interface for providing a listing of search results.
Figure 4:
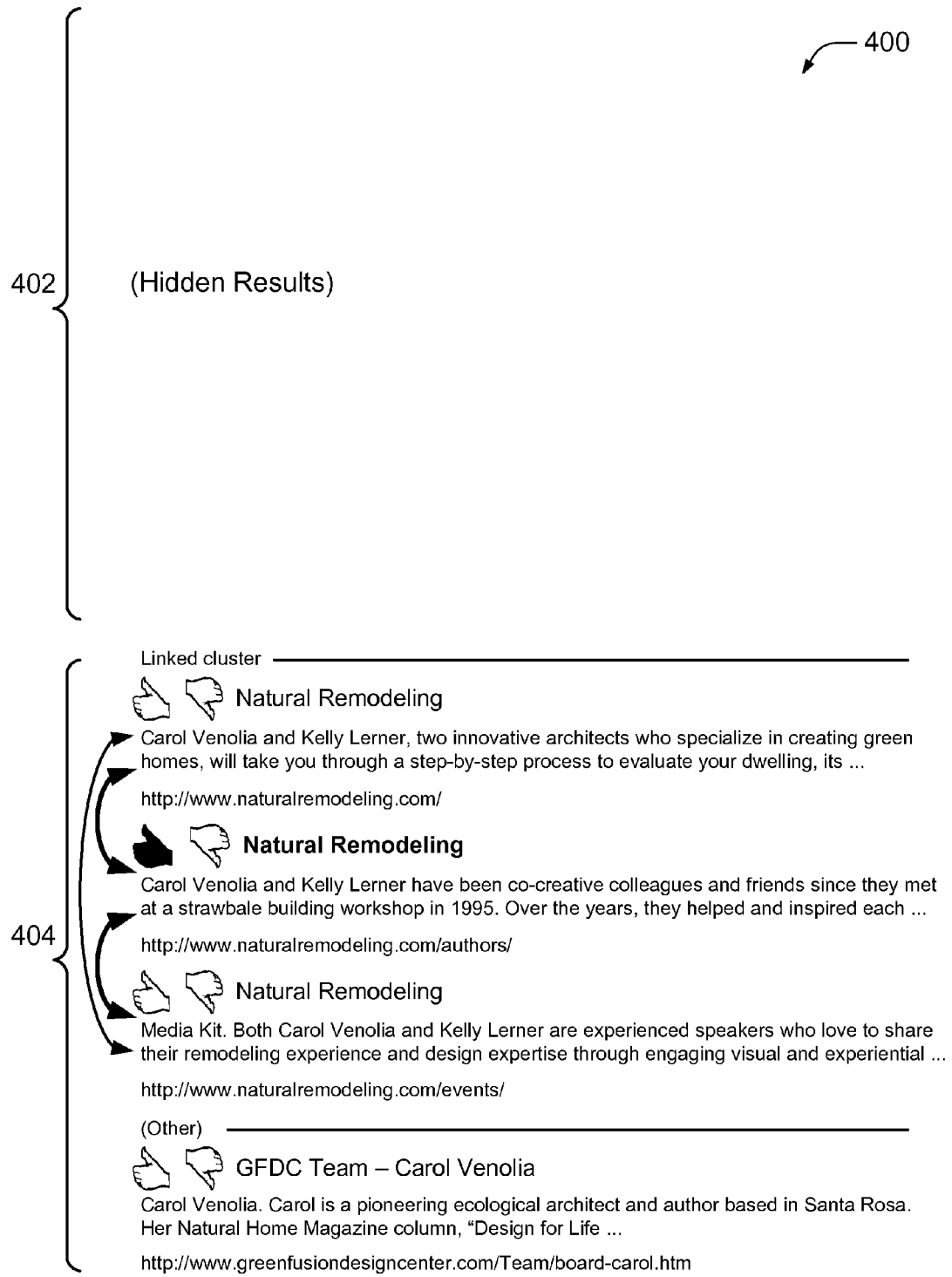
FIG. 4 is a schematic diagram showing an exemplary user interface for providing a listing of search results.

FIGS. 2, 3, and 4 illustrate schematic diagrams of exemplary user interfaces showing a list of search results generated by a search engine in response to receiving a search query from a user. The terms query, keyword, and target may be used interchangeably to describe the word the user submits for a web search. In this example query the query term is "Venolia."

In FIG. 2 the user interface 200 shows search results grouped into two linked clusters, the first linked cluster 202 related to automobiles and the second linked cluster 204 related to remodeling. A web page that is not part of a linked cluster is listed under an "Other" category 206 in the search results. The listing of each search result may include a way for the user to indicate if the search result is subjectively relevant to his or her search query. In this embodiment the indication of subjective relevance is provided by selecting a thumbs-up (relevant) 208 or thumbs-down (not relevant) 210 icon.

Subjective relevance is not limited to a binary condition. In some embodiments, the subjective relevance could be indicated by a scale such as from one (not relevant) to five (very relevant). Subjective relevance may be indicated in any way that associates the user's judgment with a given one of the search results.

In the user interface 200 arcs 212, 214 next to the listing of search results may provide an indication of hyperlinks between the web pages. The arcs 212, 214 may, in some embodiments, indicate directionality of the hyperlinks. In this representation, arrows heads on the arcs 212, 214 point to the web page linked to by the hyperlink. A doubled headed arc 214 indicates two web pages that hyperlink to each other. A linked cluster of web pages 202, 204 may contain a web page that does not have any arcs connecting that web page to other web pages in the linked cluster. As is described below, linked clusters are formed not only based on the hyperlinks between the web pages that are visible in the search results, but also based on hyperlinks to web pages not visible in the search results. Thus, linked clusters may be formed by direct and/or indirect hyperlinks between web pages.

In some embodiments the arcs may be displayed to minimize the number of crossings of one arc over another arc. When multiple arcs point to (or from) a given list item the user interface 200 may order the arcs leaving the given list item such that arcs connected to list items above the given list item are placed near the top of the given list item. Conversely, arcs connected to list items below the given list item are placed near the bottom of the given list item. Additionally arcs connected to list items near the given list item are placed near the top (if connecting to an above list item) or the bottom (if connecting to a below list item). Arcs connecting to list items far from the given list item are placed towards the center-top of the given list item (if connecting to an above list item) or towards the center-bottom of the given list item (if connecting to a below list item).

In FIG. 3 the user interface 300 shows the same listing of search results as in FIG. 2. However, in user interface 300 one of the search results related to automobiles is indicated as not relevant by selection of the thumbs-down icon 302 and one of the search terms related to remodeling is indicated as relevant by selection of the thumbs-up icon 304. In some embodiments, a user's indication of subjective relevance of a search result will lead to changes in the display of arcs originating from the search result. For example, selection of the thumbs-down button 302 changes the arc originating from a not relevant list item from a solid line to a dotted line 306 and selection of the thumbs-up button 304 changes the arc originating from a relevant list item from a thin line to a thick line 308. The relevant marking for an arc originating from a relevant list item may be a different style of line (e.g. thick), a different color of line (e.g. green), or any other distinguishing marking. Similarly, the not relevant marking for an arc originating from a not relevant list item may be a different style of line (e.g. dotted), a different color of line (e.g. red), or any other distinguishing marking. In embodiments where ranking is not binary, but is a gradated condition, the markings of the arcs may change accordingly such that increasing relevance leads to, for example, a thicker line or stronger green color, and decreasing relevance leads to, for example, greater spacing between dots or stronger red color.

In FIG. 4 the user interface 400 shows a user interface similar to the user interface of FIG. 3. However, the user interface 400 does not display the first linked cluster related to automobiles 402. Rather the results are hidden but are not deleted. In some embodiments, when the user indicates non-relevance for a list item (e.g. thumbs-down 302 for Race Links) that list item and other list items in the same contiguous cluster (e.g. the other three listings in the first linked cluster 202 of FIGS. 2 and 3) are removed from the listing of search results. This can be considered a bulk operation because the operation acts on multiple list items at once. List items 404 in clusters that received an indication of relevance, or no indication whatsoever, remain displayed in the user interface 400.

In other embodiments (not shown) instead of removal, a contiguous cluster of list results for which the user indicates non-relevance may be demoted to a lower position in the listing of search results, decreased in size, displayed in a less prominent or less contrasting manner, or the like. When list items are removed from the list by a bulk operation or otherwise, additional items may be automatically added to the listing of search results. For example, if only a most relevant 25 web pages are presented as list items in the listing of search results, following removal of five web pages in response to an indication of non-relevance, the web pages ranked 26-30 would be added to the listing of search results. The indication of non-relevance from the user is given more weight than the relevancy ranking determined by the search algorithm so the search results are re-ranked following the indication of non-relevance.

Undirected Graph

Figure 5:
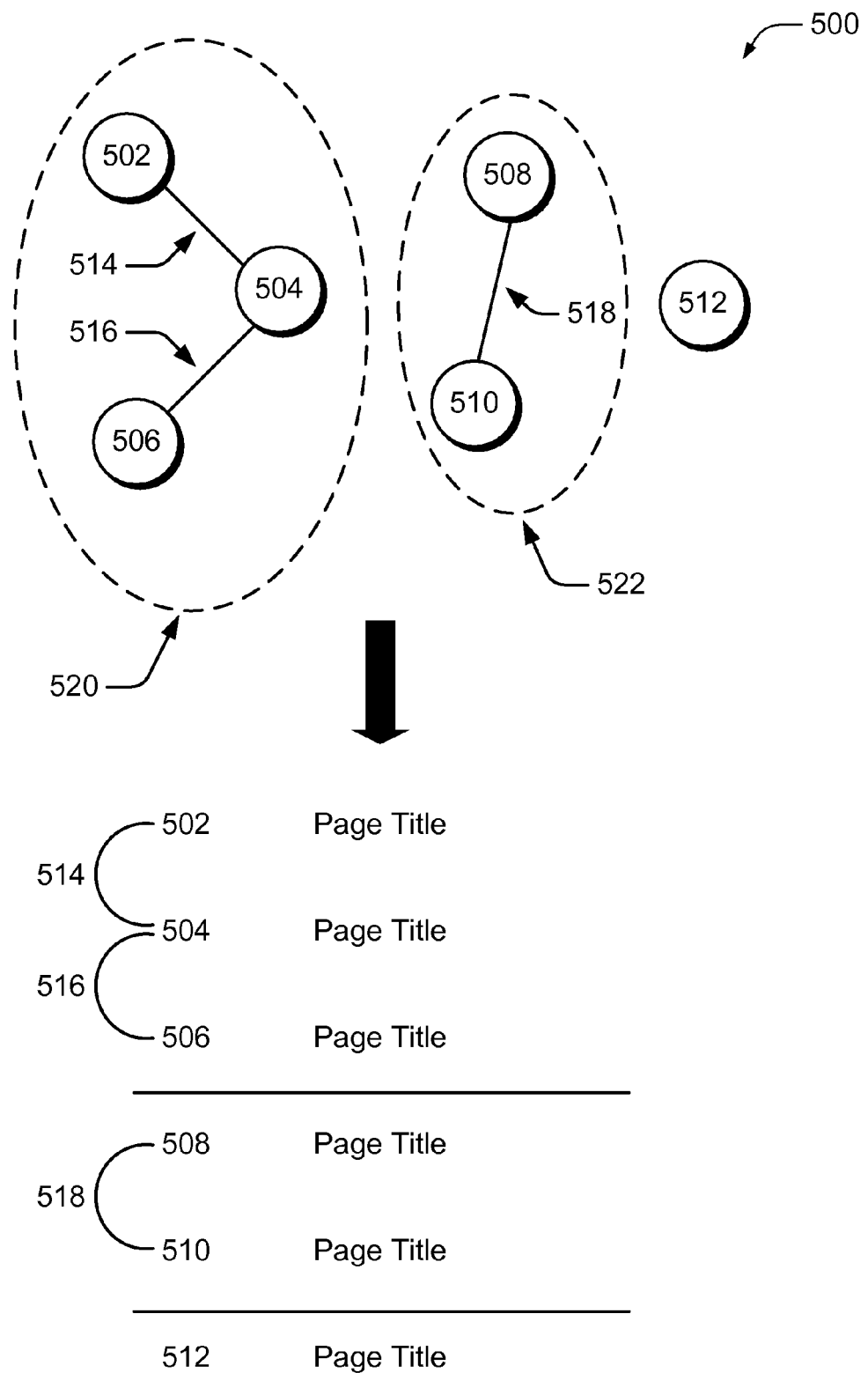
FIG. 5 is an undirected graph of nodes and edges converted into an enhanced list.

FIG. 5 shows an exemplary creation of an enhanced list from an undirected graph of web pages and hyperlinks 500. In an undirected graph the edges have no orientation (i.e. the graph does not differentiate between in and out hyperlinks). This graph is not displayed to the user but forms a basis for generating the list of search results. Web pages, 502, 504, 506, 508, 510, 512 identified by a search algorithm or other means are connected to each other by hyperlinks. For example, hyperlink 514 connects web page 502 and web page 504. Hyperlink 516 connects web page 504 and web page 506. Hyperlink 518 connects web page 508 and web page 510.

As shown in FIG. 5, Web page 512 is not hyperlinked to any of the other web pages 502, 504, 506, 508, 510. Embodiments in which the nodes and edges of the undirected graph are not web pages and hyperlinks are also covered within the scope of this disclosure.

Analysis of the web pages 502, 504, 506, 508, 510, 512 and hyperlinks 514, 516, and 518 using techniques from graph theory enables detection of connected components 520, 522. Two nodes (e.g. web pages) are defined to be in the same connected component if there exists a path (e.g. hyperlink) between the two nodes. In an undirected graph, a connected component is a maximal connected subgraph. Web pages 502, 504, 506 are part of a connected component 520 because of shared hyperlinks 514, 516. Web pages 508, 510 are part of a connected component 522 because of the hyperlink 518 connecting these two web pages.

A list of the web pages 502, 504, 506, 508, 510, 512 may be created from the undirected graph. Web pages are grouped according to connected component 520, 522. For example, web pages 502, 504, 506 and are grouped together in the list of web pages. This grouping may be similar to linked cluster 202 in FIG. 2. The list of web pages is enhanced by addition of arcs indicating hyperlinks 514, 516, 518. These arcs may be similar to the arcs 212, 214 shown in FIG. 2.

Illustrative Process

Figure 6:
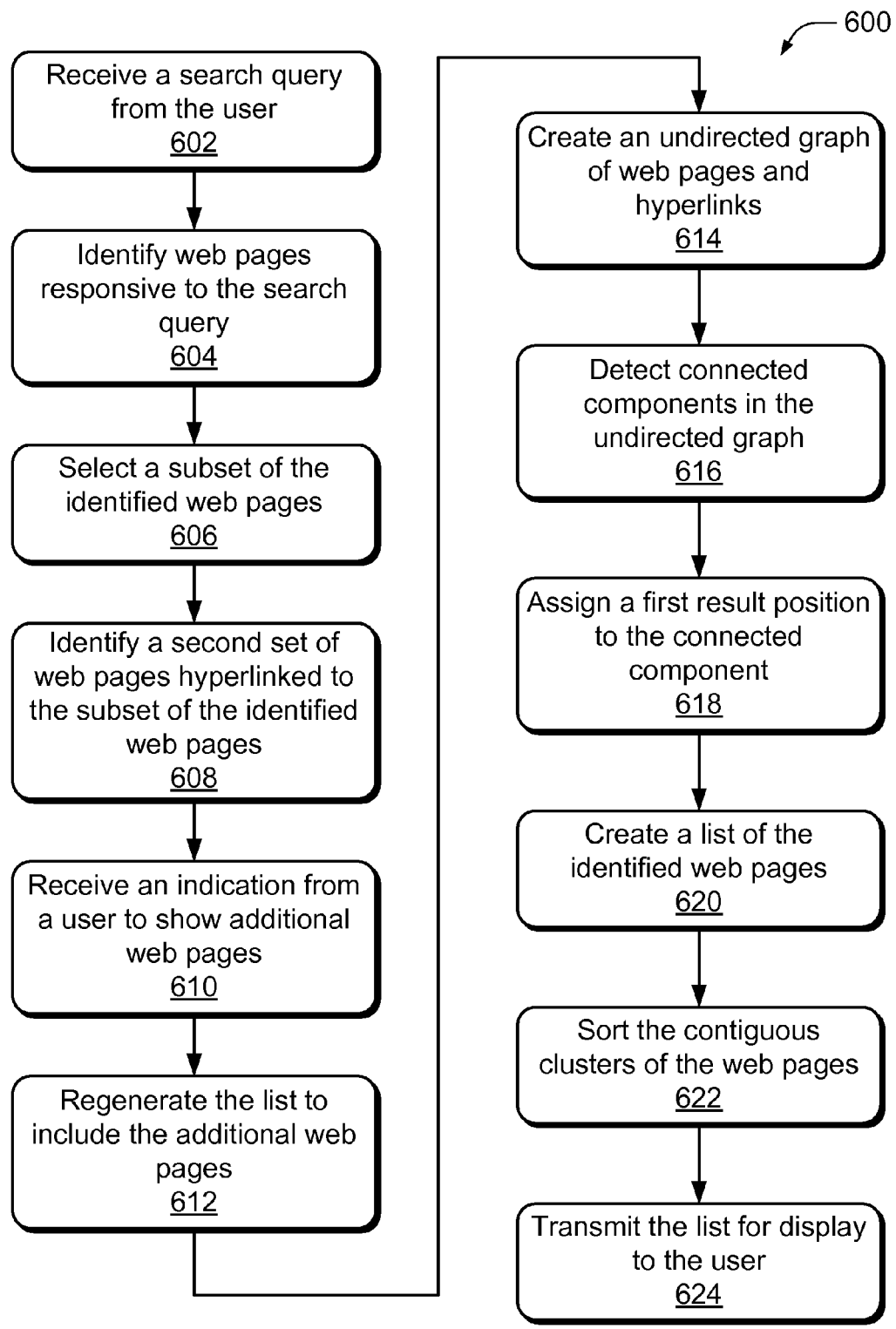
FIG. 6 is a flowchart showing an exemplary method for generating the exemplary user interface of FIG. 2.

Illustrated in FIG. 6 is an overview exemplary flowchart of a process 600 for generating a list of search results related to a search query for display to a user. For ease of understanding, the method 600 is delineated as separate steps represented as independent blocks in FIG. 6. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

The flowchart for the process 600 provides an example of a method for generating the user interface shown in FIGS. 2-4. Shown at block 602, a search query from the user is received for a search. The search query may be received at any computing device including, but not limited to, a client computing device that receives a query directly from a connected input device operated by the user or a server computing device that may receive the search query via a network such as the Internet.

Shown at block 604, the process 600 identifies web pages responsive to the search query. The web pages may be identified by any appropriate search algorithm such as a keyword matching, by category, or by metadata such as product price. The search algorithm may rank the results by assigning a unique first result position to each identified web page based on relevance to the search query. For example, the most relevant web page, as determined by the search algorithm, is given a first result position of 1, the second most relevant web page is given a first result position of 2, and so forth. In some embodiments the rankings may not be unique, so multiple web pages could have a same first result position. There is no limit on the number of web pages that may be identified. At this stage a full list of identified web pages may or may not be displayed to the user. In short, this step identifies a first set of web pages that provide a starting point for generating a list of search results to display to the user.

Shown at block 606, the process 600 selects a subset of the identified web pages. In some embodiments, this subset of web pages has a first result position above a relevance threshold. For example, if thousands of web pages are initially identified based on the search algorithm, only the top several web pages may be selected. The relevance threshold may be set at any level, for example, the most relevant ten web pages, the most relevant 100 web pages, etc. If only a few web pages are initially identified, every identified web page may be above the relevance threshold, and thus, the web pages in the subset would then be the same as the initially identified web pages. There are several ways for determining the relevance threshold: predetermined, determined by the user at the time of entering the query, or determined by the user at the time of receiving the query results. Limiting the results to a subset avoids overwhelming the user and may reduce the processing power required to create and display the listing of search results. Basically, this step reduces the first set of identified web pages to a more manageable subset of web pages.

At block 608, the process 600 identifies a second set of web pages hyperlinked to the subset of identified web pages. Hyperlinked web pages include both pages directly hyperlinked and web pages hyperlinked via hyperlinks to one or more intervening web pages. Other web pages directly hyperlinked to the web pages in the subset of identified web pages may be identified as "one-hop" or "one-degree" away from web pages in the subset of identified web pages. Web pages directly hyperlinked to these "one-hop" or "one-degree" web pages but not directly hyperlinked to the web pages in the subset of identified web pages may be identified as "two-hop" or "second-degree" web pages. In some embodiments the quality of hyperlinks is not evaluated, only the existence of a hyperlink is evaluated. A web of hyperlinked pages may be expanded until the web includes all web pages up to "n-hops" or "n-degrees" away from the subset of identified web pages. In some embodiments, only web pages directly hyperlinked to the web pages in the subset of identified web pages are identified. In other embodiments, web pages of any degree of separation (i.e. 1-hop to n-hops) from the subset of identified web pages may be identified. In some embodiments, web pages in the second set of web pages are not included in the list ultimately displayed to the user, but as described later are used to establish relationships between the web pages included in the listing of search results.

At block 610, the process 600 may change a designation of a web page in the second set of web pages to that of a web page in the subset of the identified web pages based on an indication received from the user. The indication may include, but is not limited to, the user selecting a "show all" button or a "show more like this" button associated with one of the web pages in the listing of search results.

Changing the designation of a web page may change which web pages are included in the listing of search results displayed to the user. The user may select "show all" or "show more like this" when he or she sees an interesting web page in the list and desires to see more web pages that may be similar. This ability to interact with a list of search results can blur the boundary between searching and browsing the World Wide Web (or any other node and edge structure).

When the indication is received from the user is to "show web pages linked to this web page" the process 600 changes the designation of the web pages hyperlinked to the web page indicated by the user. In some embodiments the designation is changed only for web pages directly hyperlinked (i.e. 1-hop) to the web page indicated by the user. In other embodiments the process 600 may change the designation of web pages directly and indirectly hyperlinked (i.e. 1-hop to n-hops) to the web page indicated by the user.

When the indication received from the user is to "show more web pages" similar to a web page in the listing of search results, the designation of a predetermined number of web pages hyperlinked to the web page in the listing of search results is changed. In some embodiments this may be achieved through use of a "show more like this" button. The predetermined number of web pages for which the designation is changed may be any number such as one or five additional web pages. The web pages for which the designation is changed may be directly or indirectly hyperlinked to the web page indicated by the user.

Out of all the web pages hyperlinked to the web page indicated by the user, identification of, for example, the one or five web pages most similar to the indicated web page are, in one embodiment, determined by the same search algorithm that identified the initial set of web pages in response to the search query. In other embodiments the similar web pages are identified by a hyperlink-induced topic search (HITS) algorithm. In yet other embodiments the similar web pages are identified by a comparison of textual similarity of the indicated web page to each web page hyperlinked to the indicated web page. Any or all of the above embodiments and/or additional embodiments for determining similarity may be combined to identify web pages with a similarity to the indicated web page. Basically, a feature such as a "show more like this" button evaluates web pages hyperlinked to an identified web page and adds the most similar web pages to the list of web pages displayed to the user.

At block 612, the process 600 regenerates the list to include the additional web pages. Based on the indication from the user (e.g. "show all" or "show more like this") web pages that are not visible in the list but are hyperlinked to the web pages in the list become visible web pages and are displayed in the listing of search results. Adding additional web pages to the list may change how the web pages are sorted into linked clusters and displayed in the user interface. Accordingly, the display presented in the user interface may be regenerated upon receipt of an indication from the user.

Identification of the subset of web pages and other web pages hyperlinked to the web pages in the subset of web pages provides a collection of nodes and edges that can be analyzed using techniques from graph theory. At block 614, the process 600 creates an undirected graph of the web pages and hyperlinks between the web pages where the web pages are nodes of the graph and the hyperlinks are edges. This graph may be similar to the graph shown in FIG. 5.

In block 616, the process 600 detects connected components in the undirected graph. For example, out of the identified subset of web pages and the other web pages hyperlinked within n-hops to the identified subset of web pages, all web pages that are directly or indirectly connected to each other via the hyperlinks are a connected component. The connected components may be similar to the connected components 520, 522 shown in FIG. 5.

In some embodiments is may be desirable to break a large connected component into multiple smaller connected components. The large connected component may be broken up in a way that minimizes edge cuts and creates two smaller connected components each with an equal number of hyperlinks (i.e. nodes). Each connected component comprises at least one web page identified by the search algorithm in response to the search query. As discussed above, all web pages identified in response to the search query have a first result position indicating relevance to the search query.

The identified subset of web pages may include a web page that does not have a hyperlink to any other web page in the identified subset of web pages. This web page is not part of a connected component and is eventually displayed in the list under a different category such as the "Other" category shown in FIGS. 2-4. Single web pages that are not part of a connected component also have a first result position.

At block 618, the process 600 assigned a first result position to the connected component. In some embodiments, the first result positions of all web pages in a connected component are compared and a web page in the connected component with a highest first result position is identified. The highest first result position may be assigned to the connect component as the connected component's "rank" or position. For example, if web pages ranked by the search algorithm as third most relevant, fifth most relevant, and sixth most relevant to the search query are in a connected component then the first result position "rank" of the connected component is "third". In this way connected components can be ranked based on the relevancy of the web pages in the respective connected components.

At block 620, a list of the subset of the identified web pages is created. Web pages belonging to the same connected component are listed in a contiguous cluster. In other words, web pages in the same connected component appear together in the list in a linked cluster similar to that shown in FIGS. 2-4. Basically, process 600 translates the concept of connected component from graph theory into a form that can be readily presented in a list to the user. This type of clustering is based on presence in the same connected component and not merely on presence in a same domain (e.g. *.msn.com) or merely on keywords found within the web pages.

At block 622 the contiguous clusters of web pages are sorted in the list based on the first result position of the connected component corresponding to each of the contiguous clusters. Basically, the list is ordered so that the contiguous cluster with the highest relevance (as decided by the relevance of the highest ranked web page within that contiguous cluster) comes first in the list and contiguous clusters with lower relevance come later in the list. At this step the ordering of web pages within a continuous cluster may or may not be based on relevance. The single web page that is not part of a contiguous cluster is also sorted with the contiguous clusters based on the first result position of the un-clustered web page.

In some embodiments, the process 600 may sort the web pages within the contiguous cluster. This sorting does not change the order of the contiguous clusters but only the order of web pages within a contiguous cluster. In one embodiment the web pages are sorted based on the first result position of each web page. Thus if a contiguous cluster contained the third most relevant, fifth most relevant, and sixth most relevant web pages, then the ordering in the list would be third-fifth-sixth. This ordering may be based on the ranking established by the search algorithm.

In other embodiments, the web pages within a given contiguous cluster may be sorted based on the total number in hyperlinks to each web page. The hyperlinks that are counted may be only hyperlinks to other web pages in the list or all hyperlinks including hyperlinks to web pages that are not visible in the list. The sorting may place the web page with the most hyperlinks first in the list or the sorting may place the web page with the fewest hyperlinks first in the list.

In another embodiment, the sorting considers characteristics of "authorities" and "hubs" by calculating the difference between the number of incoming hyperlinks and outgoing hyperlinks. An "authority" is expected to have more incoming hyperlinks and a "hub" is expected to have more outgoing hyperlinks. The sorting may place either web pages with more authority-like or more hub-like characteristics earlier in the list.

In yet another embodiment, the web pages within a given contiguous cluster are sorted to maximize the number of hyperlinks pointing to another web page that is listed earlier in the list. Depending on the orientation of the list, the sorting may arrange the web pages in the contiguous cluster to maximize the number of hyperlinks that point up toward the top of the list. For other list representations the hyperlinks may point down, sideways, or in another direction. For example, out of all the web pages in a given contiguous cluster a web page with no outgoing hyperlinks to other web pages in that contiguous cluster would be placed at the top. A web page with no incoming hyperlinks but many outgoing hyperlinks would be placed at the bottom. Sorting the web pages to maximize the alignment of hyperlinks pointing a same direction can reduce visual clutter in the user interface and allow the user to easily see trends as to where the hyperlinks generally flow from and to.

In a further embodiment, the sorting may use an algorithm to minimize the edge lengths of the hyperlinks between the web pages within a given continuous cluster. Additionally, the process 600 may sort the web pages within the contiguous cluster based on a combination of the above embodiments including a weighted combination.

At block 624 of process 600, transmits the list for display to the user. The display may be similar to the user interface shown in FIGS. 2-4. The list items are the web pages identified as visible web pages in the listing of search results. The hyperlinks between two web pages are represented as arcs between a corresponding two list items. The arcs may be similar to the arcs 212, 214 shown in FIG. 2.

Exemplary Computing Device

Figure 7:
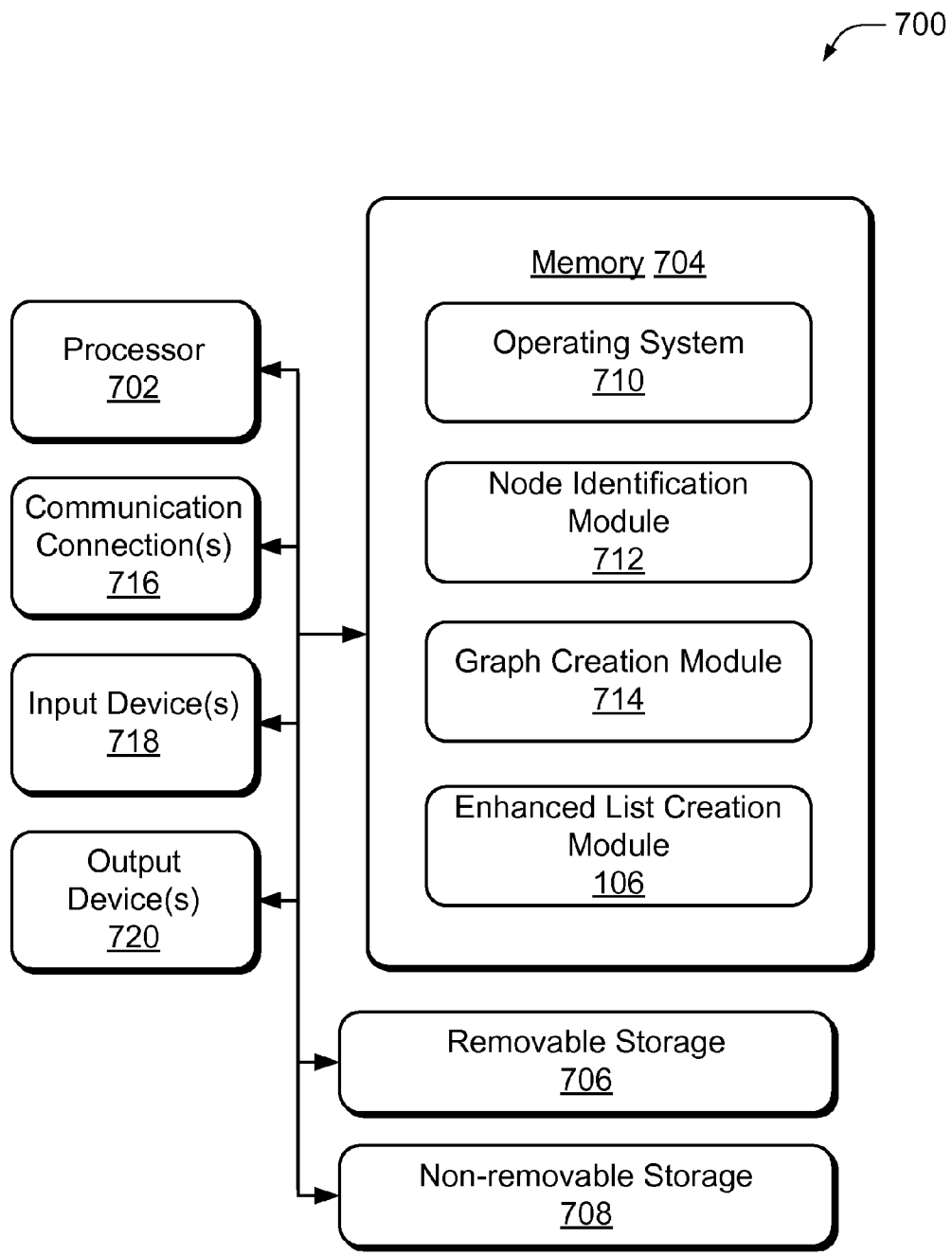
FIG. 7 is a schematic diagram showing an exemplary computing device for creating an enhanced list.

FIG. 7 is a block diagram showing an exemplary computing device 700 for creating an enhanced listing of search results. The computing device 700 may be configured as any suitable system capable of creating a user interface 200. In one exemplary configuration, the system comprises at least one processor 702 and memory 704. The processor 702 may be implemented as appropriate in hardware, software, firmware, or combinations thereof. Software or firmware implementations of the processor 702 may include computer- or machine-executable instructions written in any suitable programming language to perform the various functions described.

For example, the computing device 700 illustrates architecture of these components residing on one system or one server that may be communicatively coupled to a network such as the network 110 shown in FIG. 1. Alternatively, these components may reside in multiple other locations, servers, or systems. For instance, all of the components may exist on a client side. Furthermore, two or more of the illustrated components may combine to form a single component at a single location. The illustrated components may also reside in a computing device without a connection to a network, such as a stand-alone database.

Memory 704 may store programs of instructions that are loadable and executable on the processor 702, as well as data generated during the execution of these programs. Depending on the configuration and type of computing device 700, memory 704 may be volatile (such as RAM) and/or non-volatile (such as ROM, flash memory, etc.). The computing device 700 may also include additional removable storage 706 and/or non-removable storage 708 including, but not limited to, magnetic storage, optical disks, and/or tape storage. The disk drives and their associated computer-readable media may provide non-volatile storage of computer readable instructions, data structures, program modules, and other data for the communication devices.

Turning to the contents of the memory 704 in more detail, may include an operating system 710, one or more node identification modules 712, graph creation modules 714, and enhanced list creation modules 106 for creating a user interface 200. The memory 704 may also, in some embodiments, contain the nodes and edges used to create the listing of search results. The node identification module 712 identifies an initial set of nodes. As discussed above the nodes may be web pages identified in response to a search query. The identified initial set of nodes may be present in the memory 704, the network 110, or one or more other local and/or remote databases. Also, the computing device 700 may include a database hosted on the processor 702.

The enhanced list creation application program additionally identifies an initial and second set of nodes. As discussed above, the nodes may be web pages hyperlinked and the edges may be hyperlinks. In one embodiment, nodes directly connected to the initial set of nodes (i.e. only one-hop) by an edge are included in the second set of nodes. In other embodiments the second set of nodes may includes nodes indirectly connected by hyperlinks (i.e. more than one-hop) to the initial set of nodes.

The graph creation module 714 creates an undirected graph of the initial set of nodes, the second set of nodes, and the edges. The graph may be stored in memory 704 and not directly transmitted or displayed to a user. As discussed above, the graph provides a data structure readily susceptible to mathematical manipulations using techniques from graph theory. One such technique that may be applied to the graph is detection of connected components. Basically, detection of connected components identifies discrete, interlinked groups of nodes.

The enhanced list creation module 106 creates a list of the initial set of nodes such that nodes belonging to the same connected component are listed in a contiguous cluster. Nodes from the second set of nodes may not be included in the list, but connections created via the second set of nodes are indirectly evident in the list by the grouping that results from the connected components. This list "pre-enhancement" may or may not be displayed to the user.

The list is enhanced by including information on edges between nodes in the list as a part of a display of the list. The enhancement may take the form of arcs similar to the arcs shown in FIGS. 2-4. Other embodiments that allow the user to perceive which nodes in the list are connected to each other by edges are also included within the scope of this disclosure. The display of the list only includes nodes in the initial set of nodes, yet the graph includes both nodes in the initial set of nodes and nodes from the second set of nodes. Thus, the graph may be thought of as providing the background for the list and being made only partially visible to the user by displaying only nodes from the initial set of nodes in the list.

Computer storage media includes volatile and nonvolatile, removable and non-removable media implemented in any method or technology for storage of information such as computer readable instructions, data structures, program modules or other data. Memory 704, removable storage, and non-removable storage are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 700.

The computing device 700 may also contain communication connection(s) 716 that allows the processor 702 to communicate with servers, user terminals, and/or other devices on a network. Communication connection(s) 716 is an example of a communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The computing device 700 may also include input device(s) 718 such as a keyboard, mouse, pen, voice input device, touch input device, stylus, and the like, and output device(s), 720 such as a display, monitor, speakers, printer, etc. All these devices are well known in the art and need not be discussed at length here.

The subject matter described above can be implemented in hardware, or software, or in both hardware and software. Although embodiments of a list of web page generated in response to a search query and enhanced with a display of hyperlink information have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of generating and interacting with an enhanced list of search results. For example, the methodological acts need not be performed in the order or combinations described herein, and may be performed in any combination of one or more acts.

The invention claimed is:

1. A method for displaying hyperlinks between query results to a user on a computing device, the method comprising:

receiving a search query from the user;

identifying a first plurality of web pages responsive to the search query, wherein each webpage is assigned a unique first result position indicating a relevance to the search query;

selecting a subset of the first plurality of web pages having a first result position above a relevance threshold;

identifying a second plurality of web pages directly hyperlinked to one of the subset of the first plurality of web pages;

creating an undirected graph comprising nodes and edges, the nodes comprising web pages in the subset of the first plurality of web page and web pages in the second plurality of web pages and the edges comprising hyperlinks between the nodes;

detecting connected components in the undirected graph;

identifying the first result position of a web page in a connected component having a highest first result position as compared to other web pages in the same connected component;

assigning the identified first result position to the connected component;

creating a list of the subset of the first plurality of web pages such that the web pages belonging to a same connected component are listed in a contiguous cluster;

sorting contiguous clusters of the web pages in the list based on the first result position of each connected component;

changing a designation of a web page from the second plurality of web pages to the subset of the first plurality of web pages based on an indication received from the user:

when the indication is to show web pages directly hyperlinked to a certain one of the subset of the first plurality of web pages, the designation of web pages directly hyperlinked to the certain one of the subset of the first plurality of web pages is changed from the second plurality of web pages to the subset of the first plurality of web pages; or when the indication is to show more web pages with a similarity to the certain one of the subset of the first plurality of web pages, the designation of a predetermined number of the web pages directly hyperlinked to the certain one of the subset of the first plurality of web pages is changed from the second plurality of web pages to the subset of the first plurality of web pages, wherein the similarity is determined based on at least one of:

an algorithm to identify relevance to the search query;
a Hyperlink-Induced Topic Search algorithm; or
a comparison of textual similarity of each web page from the second plurality of web pages directly hyperlinked the certain one of the subset of the first plurality of web pages to each one of the first plurality of web pages for which the user has indicated subjective relevance; and regenerating the list based on the changed designation of the web page; and transmitting the list for display to the user, the list configured such that the web pages in the subset of the first plurality of web pages are list items and the hyperlinks between the web pages in the subset of the first plurality of web pages are arcs between the list items.

2. The method of claim 1, wherein the arcs comprise a directionality of the hyperlinks.

3. The method of claim 1, further comprising when more than one of the arcs originates at a one of the list items, the arcs are displayed to the user such that a one of the arcs does not cross another one of the arcs.

4. The method of claim 1, further comprising:
sorting the web pages within the contiguous cluster based on, for a given one of the web
pages, at least one of:
the first result position;
a total number of hyperlinks;
a number of incoming hyperlinks minus a number of outgoing hyperlinks;
a number of hyperlinks with a directionality to a web page that is listed earlier in the list than the given one of the web pages; or
an algorithm to minimize an edge length of the hyperlinks between the web pages within the contiguous cluster.

5. The method of claim 1, further comprising: receiving an indication from the user of a subjective relevance of a list item to the search query.

6. The method of claim 5, wherein the arcs comprise a relevant marking if the arcs originate from a list item having the subjective relevance indicated as relevant, or a not relevant marking, if the arcs originate from a list item having the subjective relevance indicated as not relevant.

7. A computer-implemented method comprising:
under control of one or more processors configured with executable instructions:
receiving a search query;
identifying visible nodes responsive to the search query and visible edges connecting one visible node to another visible node, each visible node representing a web page and each visible edge representing a hyperlink;
identifying non-visible nodes connected to the visible nodes by edges, each non-visible node representing a web page;
identifying non-visible edges connecting a non-visible node to a visible node or connecting the non-visible node to another non-visible node, each non-visible edge representing a hyperlink;

creating an undirected graph comprising nodes and edges, the nodes comprising the visible nodes and the non-visible nodes and the edges comprising the visible edges and the non-visible edges;

detecting connected components in the undirected graph;

creating a list of the visible nodes such that the visible nodes belonging to a same connected component are listed in a contiguous cluster;

enhancing the list by including information on the visible edges;

changing a designation of a node from non-visible to visible based on an indication received from the user:

when the indication is to show nodes directly connected by an edge to a certain visible node, the designation of non-visible nodes directly connected by an edge to the certain visible node is changed from non-visible to visible; or when the indication is show more nodes with a similarity to the certain visible node, the designation of a predetermined number of the non-visible nodes directly connected by and edge to the certain visible node is changed from non-visible to visible, wherein the similarity is based on at least one of:

an algorithm to identify relevance to the search query;
a Hyperlink-Induced Topic Search algorithm; or
a comparison of textual similarity of each non-visible node within one-hop of the certain visible node to each visible node for which the user has indicated subjective relevance; and regenerating the list to include one or more non-visible nodes designated as visible nodes; and transmitting the list for display to a user such that the visible nodes are list items and the visible edges are arcs between the list items.

8. The computer-implemented method of claim 7, wherein the arcs comprise a directionality of the visible edges.

9. The computer-implemented method of claim 7, wherein when more than one of the arcs originates at one of the list items, the arcs are displayed to the user such that a one of the arcs does not cross another one of the of arcs.

10. The computer-implemented method of claim 7, further comprising:
sorting the visible nodes within the contiguous cluster based on, for a given one of the visible nodes, at least one of:
a unique first result position indicating a relevance to the search query;
a total number of the visible edges and the non-visible edges;
a number of incoming visible edges and non-visible edges minus a number of outgoing visible edges and non-visible edges;
a number of the visible edges with a directionality to a visible node listed higher in the list than the given one of the visible nodes; or
an algorithm to minimize an edge length of the visible edges between the visible nodes within the contiguous cluster.

11. The computer-implemented method of claim 7, further comprising:
receiving an indication from the user of a subjective relevance of a list item to the search query.

12. The computer-implemented method of claim 11, wherein the arcs comprise a relevant marking if the arcs originate from a list item having the subjective relevance indicated as relevant, or a not relevant marking, if the arcs originate from a list item having the subjective relevance indicated as not relevant.

13. A system comprising:
  a processor; and
  memory, communicatively coupled to the processor, storing computer-readable instructions that when executed cause the processor to perform acts comprising:
    identifying a first plurality of nodes, each of the first plurality of nodes representing a web page;
    identifying a second plurality of nodes connected to nodes in the first plurality of nodes by edges, each of the second plurality of nodes representing a web page and each of the edges representing a hyperlink;
    creating a graph of the first plurality of nodes, the second plurality of nodes, and the edges;
    detecting connected components in the graph;
    creating a list of the first plurality of nodes such that nodes belonging to a same connected component are listed in a contiguous cluster;
    enhancing the list by including information on edges between nodes in the list as a part of a display of the list;
    changing a designation of a node from the second plurality of nodes to a subset of the first plurality of nodes based on an indication received from a user:
      when the indication is to show web pages directly hyperlinked to a certain one of the first plurality of web pages, the designation of web pages directly hyperlinked to the certain one of the first plurality of web pages is changed from the second plurality of web pages to the first plurality of web pages; or
      when the indication is to show more web pages with a similarity to the certain one of the first plurality of web pages, the designation of a predetermined number of the web pages directly hyperlinked to the certain one of the first plurality of web pages is changed from the second plurality of web pages to the first plurality of web pages, wherein the similarity is determined based on at least one of:
        an algorithm to identify relevance to the search query;
        a Hyperlink-Induced Topic Search algorithm; or
        a comparison of textual similarity of each web page from the second plurality of web pages directly hyperlinked the certain one of the first plurality of web pages to each one of the first plurality of web pages for which the user has indicated subjective relevance; and
    regenerating the list based on the changed designation of the web page.

14. The system of claim 13, the memory further comprising instructions that, when executed, cause the processor to perform the further act of generating the user interface by server computer communicatively coupled to an Internet.

15. The system of claim 13, wherein the information on the edges comprises a directionality of the edges.

16. The system of claim 13, further comprising:
  sorting the nodes within the contiguous cluster based on, for a given one of the first plurality of nodes, at least one of:
    a unique first result position indicating a relevance to a search query used to identify the first plurality of nodes;
    a total number of edges;
    a number of incoming edges minus a number of outgoing edges;
    a number of edges with a directionality to a node listed higher in the list than the given one of the first plurality of nodes; or
    an algorithm to minimize an edge length of edges between the nodes within the contiguous cluster.

17. The system of claim 13, further comprising: receiving an indication of a subjective relevance of a one of the first plurality of nodes to a search query used to identify the first plurality of nodes.

18. The system of claim 17, wherein when the indication comprises an indication of non-relevance, the one of the first plurality of nodes and other nodes in a same contiguous cluster are removed from the list.

* * * * *